(12) United States Patent
Trimeloni et al.

(10) Patent No.: US 9,154,036 B2
(45) Date of Patent: Oct. 6, 2015

(54) SYSTEMS AND METHODS TO CONTROL DC/DC MULTIPHASE SWITCHING REGULATORS

(71) Applicant: Maxim Integrated Products, Inc., San Jose, CA (US)

(72) Inventors: Vincent Trimeloni, Cupertino, CA (US); Ivo Pannizzo, Gravina di Catania (IT); Antonio Magazzu, Messina (IT); Armando Presti, Acireale (IT)

(73) Assignee: Maxim Integrated Products, Inc., San Jose, CA (US)

( * ) Notice: Subject to any disclaimer, the term of this patent is extended or adjusted under 35 U.S.C. 154(b) by 270 days.

(21) Appl. No.: 13/858,706

(22) Filed: Apr. 8, 2013

(65) Prior Publication Data

US 2014/0300331 A1   Oct. 9, 2014

Related U.S. Application Data

(60) Provisional application No. 61/788,976, filed on Mar. 15, 2013.

(51) Int. Cl.
*H02M 1/084* (2006.01)
*H02M 3/158* (2006.01)

(52) U.S. Cl.
CPC .... *H02M 3/1584* (2013.01); *H02M 2003/1586* (2013.01)

(58) Field of Classification Search
CPC ... H02M 1/084; H02M 1/0845; H02M 1/088; H02M 3/1584
See application file for complete search history.

(56) References Cited

U.S. PATENT DOCUMENTS

2005/0200343 A1* 9/2005 Ueda ............................. 323/282

* cited by examiner

*Primary Examiner* — Harry Behm
(74) *Attorney, Agent, or Firm* — North Weber & Baugh LLP

(57) ABSTRACT

Various embodiments of the invention provide extend the switching frequency range of DC/DC multiphase switching regulators in order to overcome prior art frequency limitations in the number of available phases, for example, in low input to output ratio applications. In certain embodiments, this is accomplished by enabling partial overlap between multiple phases using asynchronous logic. The invention is easily scalable without introducing significant silicon area penalties.

20 Claims, 8 Drawing Sheets

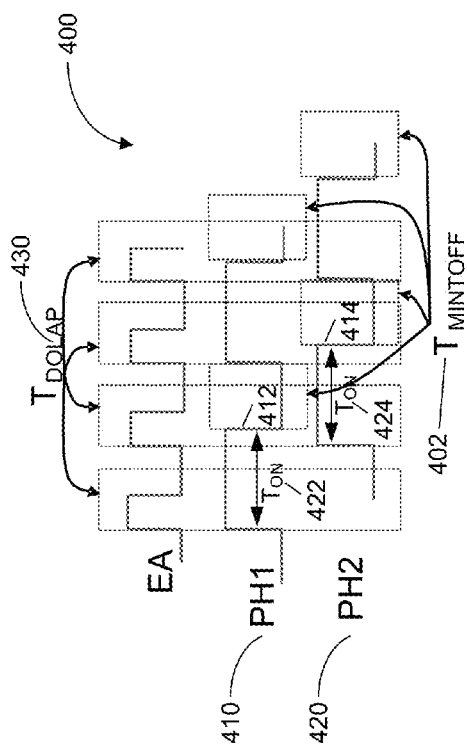
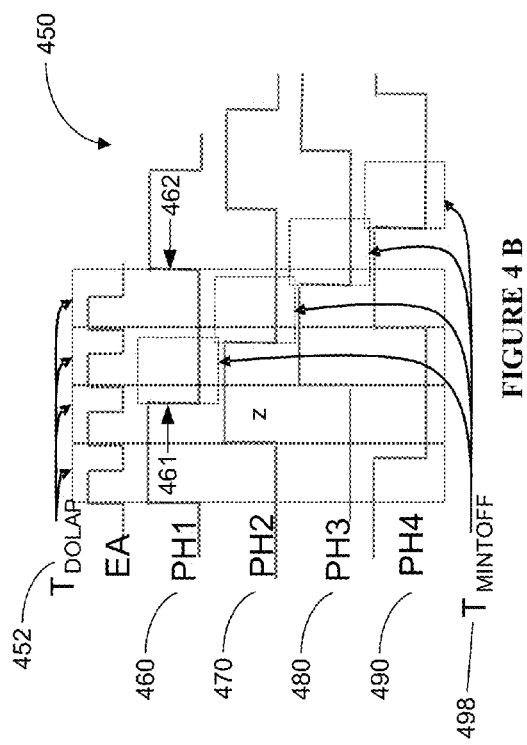
FIGURE 4 A
FIGURE 4 B

SYSTEMS AND METHODS TO CONTROL DC/DC MULTIPHASE SWITCHING REGULATORS

CROSS REFERENCE TO RELATED PATENT APPLICATIONS

The present application claims priority to U.S. Provisional Application Ser. No. 61/788,976 titled "Systems and Methods to Control DC/DC Multiphase Switching Regulators," filed on Mar. 15, 2013 by Vincent Trimeloni, Ivo Pannizzo, Antonio Magazzu and Armando Presti, which application is incorporated herein by reference in its entirety.

BACKGROUND

A. Technical Field

The present invention relates to power supplies, and more particularly, to systems, devices, and methods of controlling DC/DC multi-phase constant on time switching regulators.

B. Background of the Invention

Multiphase DC/DC converters are used in consumer electronics applications to supply power to CPUs for notebook, servers, and in many other applications that require high DC/DC converter bandwidth, low inductor ripple current, reduced inductor size, reduced output capacitor decoupling requirements, and high output voltage accuracy when subjected to load current variations. Conventional constant on time architectures or adaptive on time architectures are not widely used for multiphase switching regulators with more than three phases, because compared to other solutions, these kinds of regulators suffer greatly from duty cycle limitations that disproportionally worsen as the number of phases is increased. At any given operating frequency, the duty cycle is limited by 1/Nph, where Nph represents the number of phases. The maximum duty cycle in existing applications is typically 25 percent, such that the maximum number of phases is three, which corresponds to a theoretical maximum duty cycle of 33 percent.

Conventional constant on time and adaptive on time multiphase DC/DC converters are typically implemented with single error amplifiers and single on time generators that generate non-overlapping consecutive phases. In fact, multiphase architectures that use a single on time generator are incapable of generating overlapping phases for a constant load. Nonoverlapping consecutive phases are generated by blanking, in a present cycle, the on time pulse of the following cycle by a minimum off time that must expire before the on time pulse can be triggered. Unfortunately, the off time delay restriction may significantly slow down transient response time, especially for heavy load transients. In addition, the minimum off time reduces the theoretical maximum duty cycle limit of 1/Nph.

One possible approach to avoid the strict requirement of nonoverlapping multiple phases is to employ one error amplifier and one corresponding on time generator for each phase. However, using multiple error amplifiers greatly increases the complexity of the converter, for example, due to the difficulty to ensure proper phase shift between phases, which renders this approach rather impractical.

What is needed are tools for switching regulator designers to overcome the above-described limitations and to meet the new demands of the marketplace.

SUMMARY OF THE INVENTION

Various embodiments of the invention allow to increase the maximum number of phases of a DC/DC multiphase switching regulator for a given switching frequency by enabling partial overlap between multiple phases. Avoiding the strict requirement of nonoverlapping multiple phases allows to eliminate waiting periods, and improves transient response.

Certain embodiments of the invention accomplish this by a novel method of multi-phase on-time pulse triggering that eliminates the requirement of using a transient detecting system to detect the presence of load current variations.

In certain embodiments, a minimum off time within a same phase is preserved to ensure proper operation of an error comparator. In some embodiments, a minimum nonoverlap time timer prevents a total overlap condition by blanking the time between rising edges of on time pulses in different phases. In one embodiment, individual on time timers and minimum off time timers independently determine on times and off times for each phase.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4A and FIG. 4B illustrate characteristic boundary conditions on the maximum switching frequency of a multiphase switching regulator control system according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
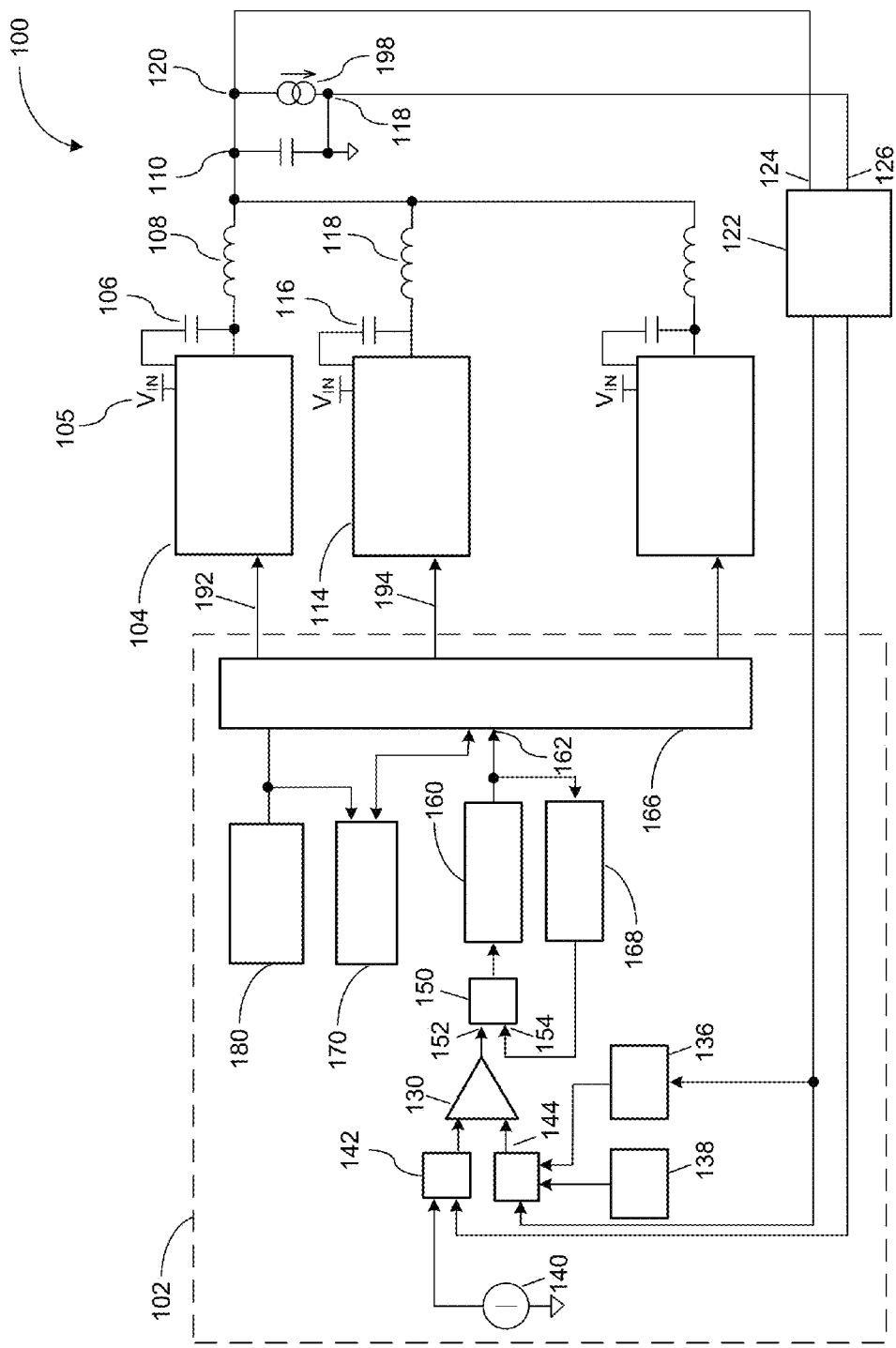
FIG. 1 shows a block diagram of a prior art constant on time multiphase regulator system.

FIG. 1 shows a block diagram of a prior art constant on time multiphase regulator system. Regulator system 100 comprises switching regulator controller 102, switching network 104, 114, boost capacitor 106, 116, output capacitor 110, inductor 108, 118, and feedback network 122. Switching network 104, 114 comprises driver circuitry to activate internal or external high side and lower side switches in response to PWM signal 192, 194 to convert input voltage $V_{IN}$ 105 that is applied to each switching network 104, 114 into relatively lower output voltage $V_{OUT}$ 120, which is the voltage to be regulated. Switching regulator controller 102 comprises transient detector system 180, error comparator 130, on time timer 160, minimum off time timer 168, and phase selector 170.

Phase selector 170 comprises N number of outputs that are configured to consecutively assign a logic high signal to the N phase multiplexer outputs. Phase selector may be implemented as a phase shift register, such as a ring register, that at the rising edge of the clock pulse automatically multiplexes or shifts a high level logic signal (e.g., 1) to the next phase in a looped fashion, similar to a digital clock. In response, phase multiplexer selects the appropriate phase to which to apply the output of the error comparator, such that the error amplifier signal is multiplexed with one phase at a time.

Transient detector 180 is a circuit that compares a feedback signal and a target signal to a threshold voltage or uses, for example, a digital algorithm to count the cycles in which the output of error comparator 130 remains at a logic high in order to detect heavy load transient. In response to detecting a heavy step current load at output 120, transient detector 180 turns on all phases, typically in the following cycle, in order to counteract the effect of the current load step, which enhances the capability of multiphase regulator system 100 to deliver energy during a transient. The alternative would be to continuously alternate the on time for each phase and also wait for each minimum off time to end. This, however, would result in a design that may lack the capacity to immediately provide sufficient energy to satisfy the current demand by the load when the load current rapidly and significantly varies. Additionally, a significant undershoot in the output voltage 120 waveform would result following the load current step. Thus, one major drawback of transient detector 180 that forces design compromises, which complicate the design and reduce effectiveness, is that once a transient is detected, all phases must be turned on to preserve the current balance, such that multiphase regulator system 100 delivers one or more discrete amounts of energy to the load, irrespective of the intensity of the transient. As a result, if excess energy delivered to the load, depending on transient intensity and timing, an undershoot situation that is to be regulated can turn into an undesired overshoot situation before reaching steady state again.

In operation, multiphase regulator system 100 reacts to a positive current step on load 198 by increasing the average current on each inductor 108, 118 in order to meet the current demand of the load while continuing to generate a relatively constant DC output voltage $V_{OUT}$ 120 with limited undershoot or overshoot. System 100 accomplishes this by forwarding voltage and/or current information to feedback network 122, which is coupled between voltage load 120 and error comparator 130, to provide the needed on time pulses in order to continuously adjust the regulated voltage to internal target 140. The rising edge of the digital error comparator signal creates an on-time signal through phase multiplexer 166. During the on times of PWM signal 192, 194, switching network 104, 114 provides current to inductor 108 and 118, respectively. PWM signal 192, 194 is used to regulate switching network 104, 114 in a manner that generates an increasing current through inductor 108, 118 during a transition phase in which the switching frequency is increased to reach the new current requirement.

In this example, during this process, after each on time pulse, each phase of multiphase system 100 requires a minimum off time to ensure that boost capacitor 106, 116 is fully recharged, so that error comparator 130 can be reset to a proper status and on time timer 160 has sufficient time to be reset and ready to provide a new on time pulse that can drive the high side power MOSFET in switching network 104, 114. The minimum off time management of multiphase regulator system 100 in FIG. 1 minimizes the number of timers to one on time timer 160 and one minimum off time timer 168, regardless of number of phases employed. Multiphase regulator system 100 requires a minimum off time, $T_{OFFMIN}$, between two consecutive phases. $T_{OFFMIN}$ contributes to limit the switching period by $$N*(T_{ON}+T_{OFFMIN})<T_{SW},$$

where N is the number of phases and $T_{SW}$ is the switching period. In FIG. 1, $T_{OFFMIN}$ and is generated by minimum off time timer 168, and is typically in the order in the order of 100 ns.

Figure 2:
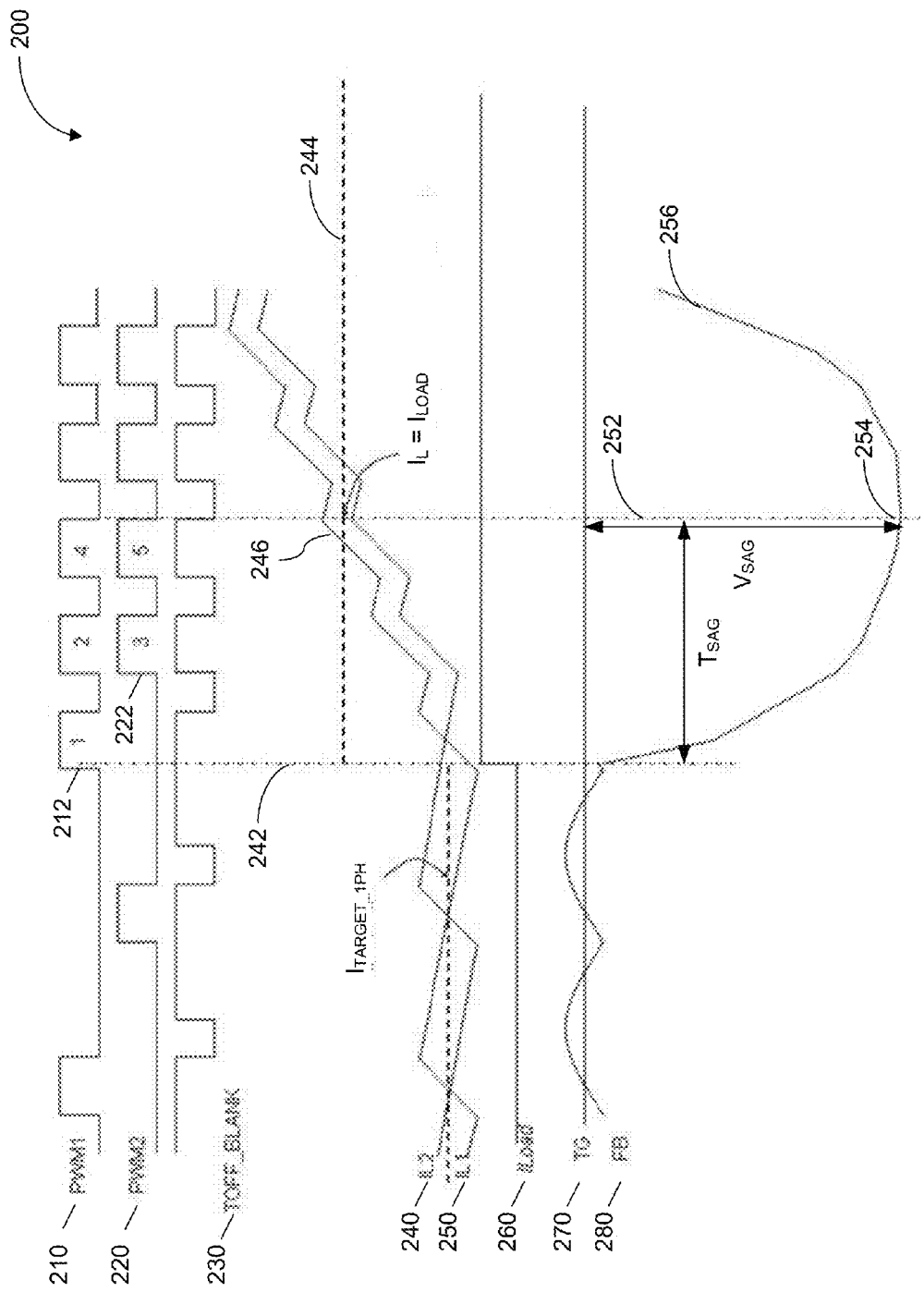
FIG. 2 shows a typical transient response of the prior art regulator system in FIG. 1.

Defining the switching period of multiphase regulator system 100 as $T_{SYS}=T_{SW}/N$, it becomes apparent that the frequency limitation (or the equivalent dynamic switching frequency during a transient) of this architecture is reached when the system switching period approaches the combined on time and minimum off time, i.e., $T_{SYS\_MIN}=(T_{ON}+T_{MINOFF})$. FIG. 2 shows a typical transient response of the prior art regulator system in FIG. 1.

FIG. 2 depicts load current transient step 244 and a corresponding response of inductor currents IL1 250, IL2 240 and load current 260 for a 2-phase constant on time multiphase regulator system according to FIG. 1. PWM signal 210, 220, and blanking signal waveforms 230 are shown in relationship thereto. FIG. 2 further depicts target output voltage signal 270 and feedback voltage signal 280.

PWM1 signal 210 and PWM2 signal 220 are trains of pulses for two phases. Each pulse train controls one switching network per inductor to produce an inductor current. Inductor currents IL1 250 and IL2 240 superimpose to form load current 260. Once load step 244 occurs, due to the non-linearity and limited bandwidth inherent in switching regulator controller, regulator system exhibits inertia to react to the deviation and re-establish a steady state condition. As a result, inductor currents 240, 250 and, hence, load current 260 does not increase instantaneously, but rather linearly, as shown in FIG. 2.

Blanking signal 230 ensures that in response to load step 242 each pulse within the same PWM signal 210, 220 is spaced apart from the following pulse by a period of time equal to a minimum turn off time. Once the transient detector detects the presence of load step 244 at time 242, load current 260 exceeds the sum of current 240, 250 provided by the system to the load. The unbalance in system causes output capacitor to temporarily provide charge to the load in order to meet the increased current demand. This causes the output voltage and, thus, the feedback voltage to sag and deviate from target signal 270 by a value labeled $V_{SAG}$.

Feedback voltage signal 280 reaches local minimum 254 when inductor sum of current 240, 250 reaches load current 244 at time 252. The time between the rising edge of current load step 244 at time 242 and time 252 when the output voltage is at a minimum is labeled $T_{SAG}$. As shown, for this particular example, $T_{SAG}$ is reached with 5 on time pulses in a time equal to three on time pulses and two minimum off time waiting periods, i.e, $T_{SAG} = 3T_{ON} + 2T_{OFFMIN}$. Feedback voltage signal 280 deviates from target voltage signal 270 until feedback voltage signal 280 reaches minimum 254 at time 252 when sum of current 240, 250 equals new target load current 260 imposed by the load. Since the output voltage is lower than the target voltage, at time 252, inductor current 240, 250 continues to increase for a period of time and overshoots load current 246 until it returns to settle at the new load current target value 244.

Unless the timing, direction, and magnitude of load current 260 is known in advance, each current transient step in the load will cause the output voltage to sag until the closed loop regulation system can restore the output voltage when adjusting to the new target current. The more energy a system is able to provide in response to an unbalanced situation, the faster can inductor current 240, 250 be adjusted to load current 260, and the lower is the deviation of feedback signal 280 from target 270, thereby, reducing both $T_{SAG}$ and $V_{SAG}$. Therefore, to reduce $V_{SAG}$ and $T_{SAG}$ typically all phases are turned on simultaneously.

Figure 3:
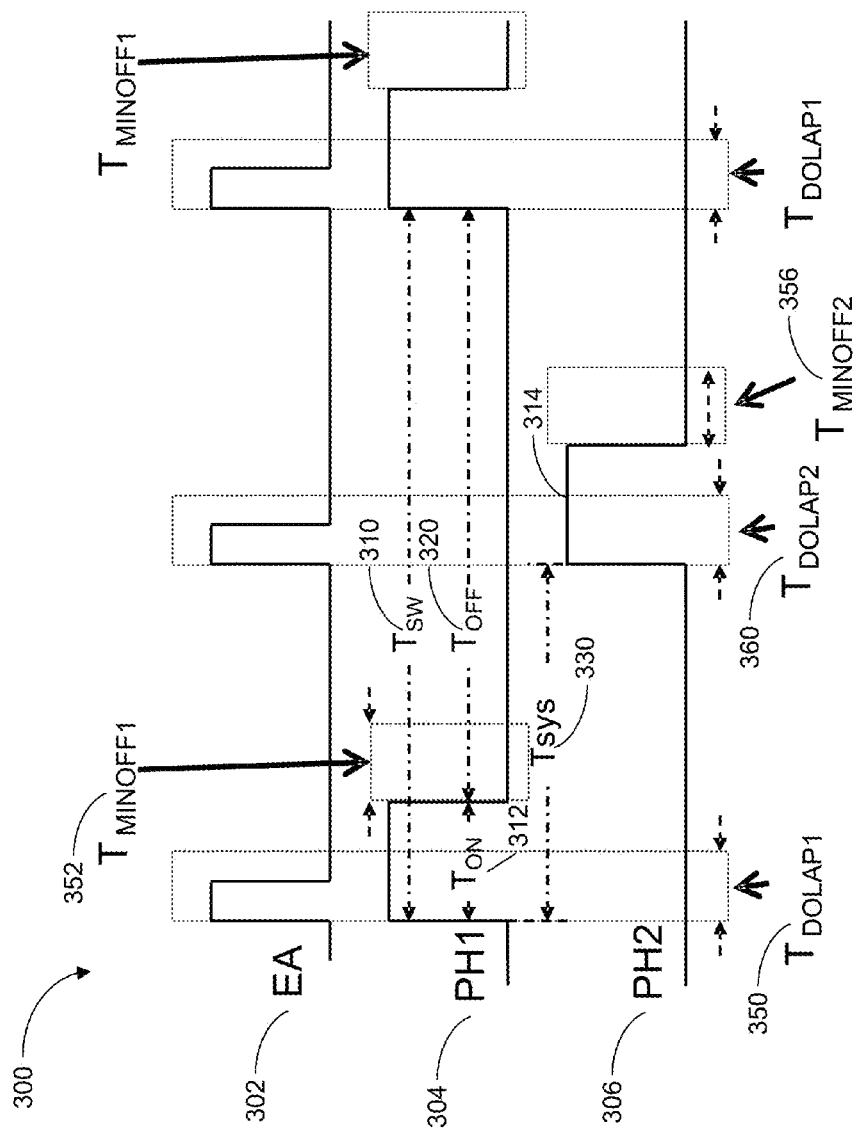
FIG. 3 illustrates a characteristic phase diagram for a 2-phase system utilizing multiphase switching regulator control according to various embodiments of the invention.

FIG. 3 illustrates a characteristic phase diagram for a 2-phase system utilizing multiphase switching regulator control according to various embodiments of the invention. FIG. 3 provides definitions of terms that will be used throughout the written description of the invention. Signal EA 302 is an error signal that, in this example, triggers signals PH1 304 and PH2 306. The rising edge of signal EA 302 alternately coincides with the rising edges of signals PH1 304 and PH2 306.

Signals PH1 304 and PH2 306 are characterized by switching period $T_{SW}$ 310 that can be defined as the time extending between two rising edges of the same pulse signal 304, 306. Each signal PH1 304 and PH2 306 is further characterized by an on time pulse 312, 314 and an off time 320 within a switching period $T_{SW}$ 310. System period $T_{SYS}$ 330 can be defined as the time between the rising edges of signal EA 302 and is equal to the switching period $T_{SW}$ 310 divided by the number N of switching phases. In this example, the number N of switching phases is 2, and system period $T_{SYS}$ 330 coincides with the edge signals of alternating phase signals PH1 304 and PH2 306.

In FIG. 3, nonoverlap times between phases are labeled $T_{DOLAP1}$ 350 and $T_{DOLAP2}$ 360 and start with each rising edge of signal PH1 304 and signal PH2 306, respectively. Once signal PH1 304 pulses, phase PH2 306 is not allowed to start a pulse during nonoverlap time $T_{DOLAP1}$ 350, i.e., signal $T_{DOLAP1}$ 350 blanks the on time of the next pulse, here pulse 314, and signal $T_{DOLAP2}$ 360 blanks the on time of pulse 316, etc. It is noted that nonoverlap times $T_{DOLAP1}$ 350 and $T_{DOLAP2}$ 360 may be generated by the same nonoverlap timer block and could have a different duration for each phase depending on various factors, without substantially changing system operation or the scope of the invention.

Signal $T_{MINOFF1}$ 352 guarantees a minimum off time within a cycle of the same phase, phase PH1 304. Signal $T_{MINOFF1}$ 352 may be used, for example, to allow sufficient recharging time for a boost capacitor within a switching network. Similarly, $T_{MINOFF2}$ 356 is the minimum off time of phase PH2 306 that blanks the next on time of phase PH1 304.

FIG. 4A and FIG. 4B illustrate characteristic boundary conditions on the maximum switching frequency (i.e., minimum switching period) of a multiphase switching regulator control system according to various embodiments of the invention. For purposes of this illustration, it is assumed that all minimum off time intervals 402 or 498 are equal, such that the minimum off time interval of one phase is equal to that of any other phase (i.e., $T_{MINTOFFx} = T_{MINTOFFx+1} = T_{MINOFF}$), and that all nonoverlap time intervals 430 or 452 are equal, such that the minimum nonoverlap time of one phase is equal to that of any other phase (i.e., $T_{DOLAPx} = T_{DOLAPx+1} = T_{DOLAP}$).

The maximum switching frequency (i.e., minimum switching period) of the novel multiphase system will be determined mainly by two design criteria: 1) minimum overlap time 452 $T_{DOLAP}$ in FIG. 4A and 2) in FIG. 4B, minimum off time $T_{MINOFF}$ 402 of a same phase. This means that the switching frequency can be increased until minimum off time $T_{MINOFF}$ 402 spans the entire time from the falling edge 412, 414 of $T_{ON}$ pulse 422, 424, until the rising edge of the following pulse of the same phase PH1 410 or PH2 420, respectively.

As shown in FIG. 4A, minimum nonoverlap time $T_{DOLAP}$ 430 for each phase is not a limitation on the switching frequency of 2-phase example 400, as the time between two consecutive rising edges of two consecutive phases is greater than $T_{DOLAP}$ 430. Instead, in FIG. 4A a limitation on the switching frequency is reached when the time between two consecutive pulses of the same phase reaches the minimum off time $T_{MINOFF}$ 402.

In contrast, in FIG. 4B, the rising edges of two consecutive phases, e.g., 460-470 are equal to minimum overlap time $T_{DOLAP}$ 452. In other words, the switching frequency can be increased until the rising edge of consecutive phases occurs just at the expiration of minimum overlap time $T_{DOLAP}$ 452 of a present phase. It follows that minimum off time $T_{MINOFF}$ 498 for each phase is not a limitation on the switching frequency of the 4-phase example in FIG. 4B, as a time greater than $T_{MINOFF}$ 498 remains between falling edge 461 of a present phase, here PH1 460, and the following rising edge 462 of the same phase. As a result, the switching frequency is limited by minimum overlap time $T_{DOLAP}$ 452. The minimum switching period of the system $T_{SYS}$ under scenario 400 in FIG. 4A can be expressed as:

$$T_{SYS\_MIN} = (T_{ON} + T_{MINOFF})/N$$

In contrast, the minimum switching period of the system $T_{SYS}$ under scenario 450 in FIG. 4B can be expressed as:

$$T_{SYS\_MIN} = T_{DOLAP}$$

A combination of both limitations, delivers the worst-case scenario resulting in a minimum switching period (i.e., a maximum switching frequency limitation) of $$T_{SYS\_MIN} = \{(T_{ON} + T_{MINOFF})/N, T_{DOLAP}\},$$

i.e., the minimum switching period of the novel system is determined by the greater of the minimum off time $T_{MINOFF}$ of the same phase and the minimum overlap time $T_{DOLAP}$.

Next, a comparison is made between theoretical maximum switching frequency limits per phase for a set of hypothetical examples with increasing number of phases. Given typical conditions for on time $T_{ON}$=200 ns, minimum off time $T_{MINOFF}$=100 ns, and minimum nonoverlap time $T_{DOLAP}$=100 ns, the above formula for the minimum switching period yields the following results:

For a 2-phase system that will be minimum off time limited, the maximum frequency per phase of the current invention is 3.34 MHz vs. 1.67 MHz in the prior art.

For a 3-phase system that will be both minimum off time limited and nonoverlap time limited, the maximum frequency per phase of the current invention is 3.34 MHz vs. 1.11 MHz in the prior art.

For a 4-phase system that will be not overlap time limited, the maximum frequency per phase of the current invention is 2.5 MHz vs. 0.83 MHz in the prior art.

When compared to the prior art, in particular for the above example in which the minimum switching period of the system was determined by $T_{SYS\_MIN}=(T_{ON}+T_{MINOFF})$, it becomes apparent that the maximum frequency that each phase of the current invention can support is doubled for the 2-phase system and tripled for both the 3-phase and 4-phase systems.

One skilled in the art, will appreciate that that different minimum off time and/or nonoverlap time intervals may be generated, resulting in more complicated formulae than the ones discussed with respect to FIG. 4.

Figure 5:
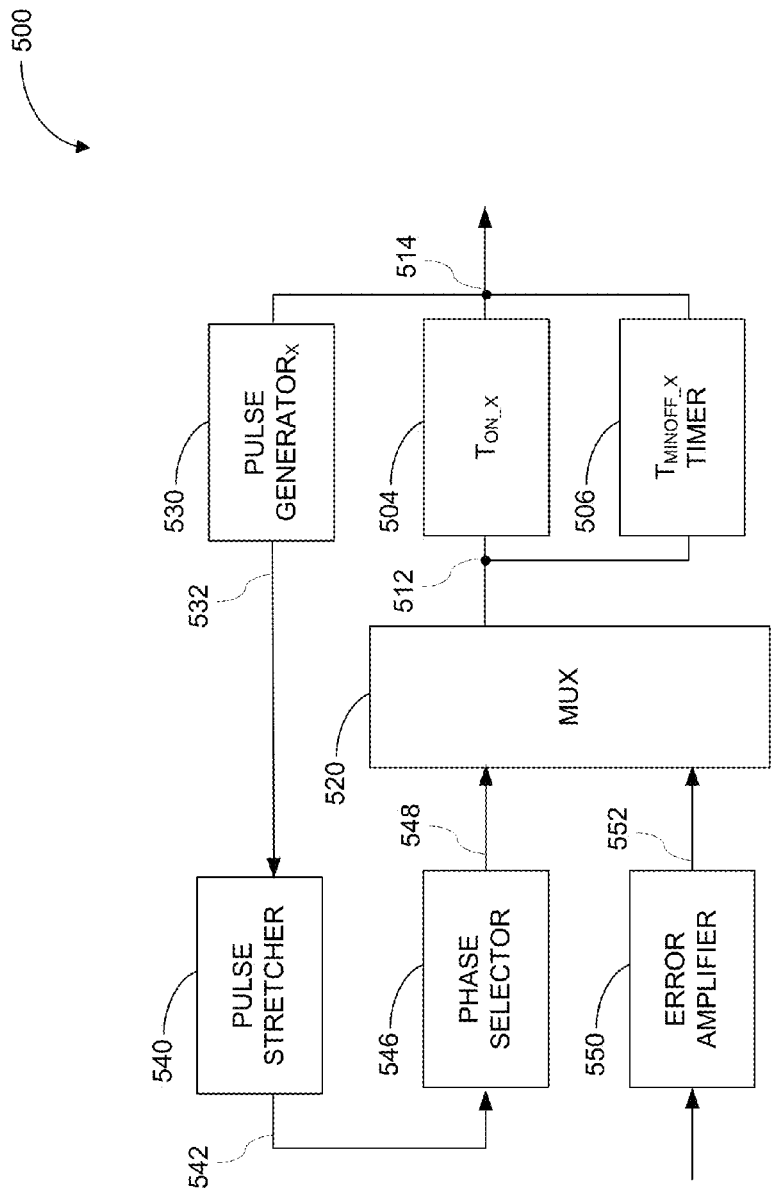
FIG. 5 illustrates an exemplary multiphase switching regulator controller according to various embodiments of the invention.

FIG. 5 illustrates an exemplary multiphase switching regulator controller according to various embodiments of the invention. Switching regulator controller 500 comprises error amplifier 550, phase multiplexer 520, on time timer 504, minimum off time timer 506, phase selector 546, pulse generator 530, and pulse stretcher 540. Error amplifier 550 is any error amplifier or error comparator known in the art that can detect a deviation in an input signal. Error amplifier 550 is multiplexed to on time timer 504 via phase multiplexer 520. On time timer 504 is coupled, for example, in a loop configuration to minimum off time timer 506. Both may be implemented as analog or digital timers. The output of on time timer 504 is input into pulse generator 530, the output of which is input into pulse stretcher module 540, for example via a combiner (not shown). The output signal 542 of pulse stretcher 540 is input to phase multiplexer 520 via phase selector 546.

In operation, switching regulator controller 500 generates PWM signal 514 that is input to a switching network, which drives a load (not shown). In one embodiment, phase multiplexer 520 multiplexes, for example at a rising edge, output signal 552 of error amplifier 550 with on time timer 504 to generate a plurality of PWM signals 514 each time error amplifier 550 trips. In one embodiment, each PWM signal 514 is sequentially input to two or more pulse generators 530, which may comprise logic gate delays. In response to receiving the rising edges of PWM signal 514, corresponding pulse generator 530 generates a train of pulses 532, in which each pulse has a predetermined duration that is relatively shorter than an on time $T_{ON}$.

In one embodiment, pulse stretcher 540 comprises a minimum nonoverlap timer that extends the pulses in signal 532 to a value equal to a predetermined nonoverlap time $T_{DLP}$ that is less than the combined times of an on time $T_{ON}$ and a minimum off time $T_{MINOFF}$ (i.e., $T_{DLP}<T_{ON}+T_{MINOFF}$). As a result, the minimum time between two consecutive turn on phases is at least $T_{DLP}$, such that phase selector 546 is prevented from selecting two consecutive pulses prior to the expiration of the nonoverlap time $T_{DLP}$. In one embodiment, phase selector 546 comprises an inverter to invert output signal 542 of pulse stretcher 540, so that a falling edge of output signal 542 causes phase selector 546 to direct phase multiplexer 520 to select the next phase to be turned on.

Figure 6:
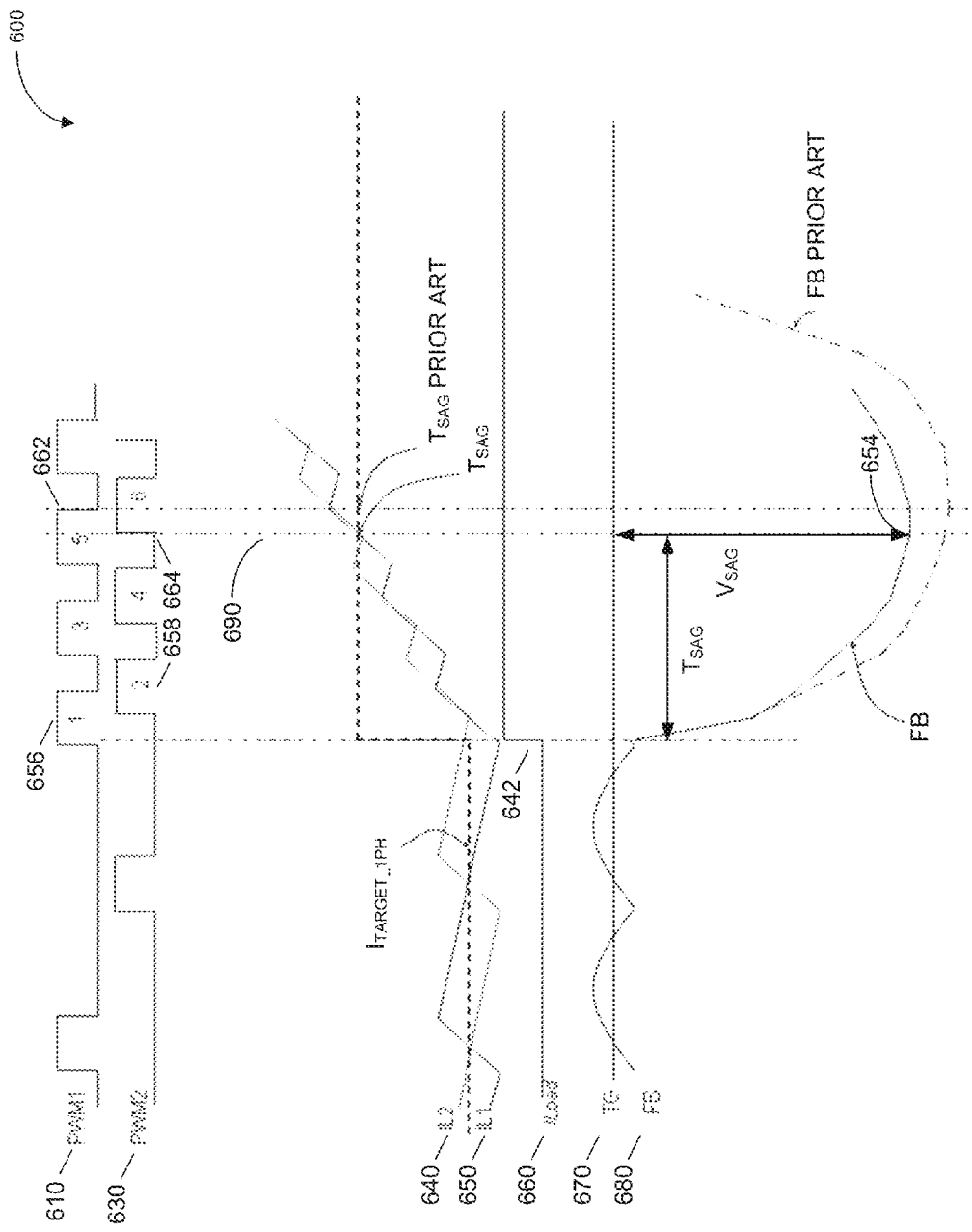
FIG. 6 illustrates an exemplary transient response of a 2-phase constant on time switching regulator controller, according to various embodiments of the invention.

FIG. 6 illustrates an exemplary transient response of a 2-phase constant on time switching regulator controller, according to various embodiments of the invention. FIG. 6 depicts load current transient step 642 and a corresponding response of inductor current IL1 650, IL2 640 and load current 660. PWM1 signal 610 and PWM2 signal 630 waveforms are shown in relationship thereto. FIG. 6 further depicts target output voltage signal 670 and feedback voltage signal 680. PWM1 signal 610 and PWM2 signal 630 are trains of pulses for the two phases. Each pulse train controls, for example, one switching network per inductor to produce an inductor current. Inductor currents IL1 650 and IL2 640 superimpose to form load current 660.

As in FIG. 2, the worst case scenario is presented, i.e., the load step occurs very early in the cycle just after the rising edge of the on time. Again, inductor current 640, 650 and, hence, load current 660 do not increase instantaneously, but rather linearly. However, unlike in FIG. 2, the novel architecture has a greater capacity to deliver energy to a load because inductor current 640, 650 is more rapidly adjusted to load current 660, as indicated by a decreased deviation of feedback signal 680 from target voltage signal 670 in comparison to the architecture in FIG. 2. This results in a reduction of both $T_{SAG}$ and $V_{SAG}$. As previously described, the architecture in FIG. 2 requires a time that is practically equal to the sum of $T_{ON}$ and $T_{OFFMIN}$ to react to the load step, whereas the novel system reacts to the load step more rapidly by allowing the error comparator to overlap by triggering an on time in the next phase immediately after a nonoverlap time in the present phase.

In this example, the novel architecture generates 5.5 pulses in the same time in which the prior art architecture generated 5 pulses, first on time pulse 658 of PWM2 signal 630 occurs after the nonoverlap time but within first on time pulse 656 of PWM1 signal 610. This immediately charges the inductor current with IL2 640. The time at which the sum of inductor current 640, 650 equals load current 660 is reached earlier than in FIG. 2 as indicated by time 690. As a result, the undershoot of feedback signal 680 is reduced. As shown in FIG. 6, time 690 occurs at the rising edge of pulse 6 664 instead of at the falling edge of phase 5 662 as was the case in the example in FIG. 2.

Therefore, feedback voltage signal 680 reaches minimum 654 relatively earlier at time 690 when inductor current 640, 650 equals new target load current 660 imposed by the load. In addition, since not all phases need to be turned on simultaneously, efficiency is also increased.

Figure 7:
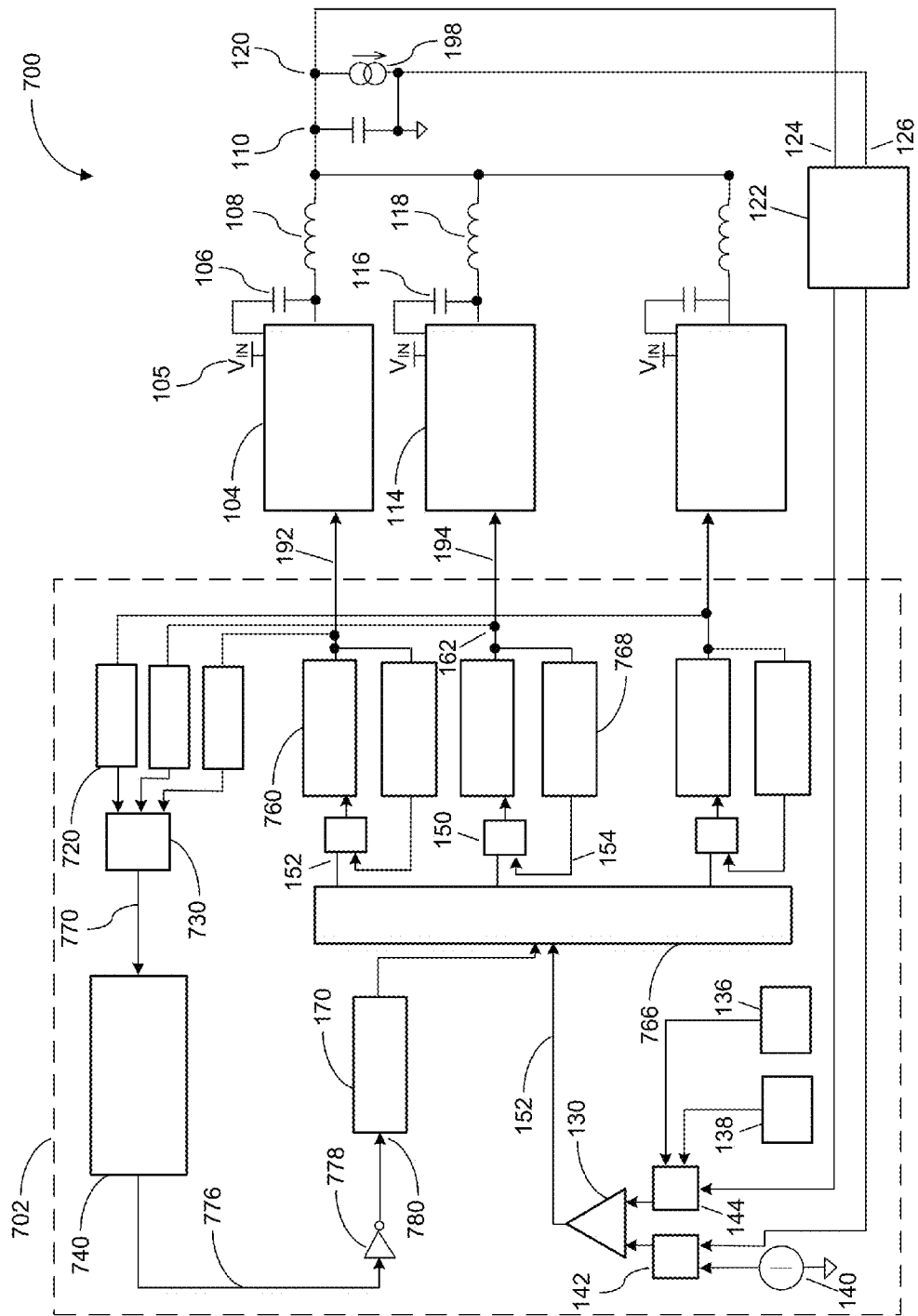
FIG. 7 illustrates an exemplary implementation of the multiphase switching regulator controller of FIG. 5, according to various embodiments of the invention.

FIG. 7 illustrates an exemplary implementation of the multiphase switching regulator controller of FIG. 5, according to various embodiments of the invention. Similar components as in FIG. 1 are enumerated similarly and their function will not be repeated herein. Multiphase regulator system 700 comprises switching regulator controller 702, switching network 104, 114, boost capacitor 106, 116, output capacitor 110, inductor 108, 118, and feedback network 122. Switching regulator controller 702 comprises error comparator 130, on time timer 760, minimum off time timer 768, phase selector 170, pulse generator 720, combiner 730, and pulse stretcher module 740. It is understood that although there are N number of inductors and N number of phases, this is not intended as a limitation on the invention.

Switching regulator controller 702 is coupled to switching network 104, 114 to provide PWMx pulse 192, 194. Switching network 104, 114 is coupled to deliver a current to load 198 through to inductor 108, 118. Feedback network 122 is coupled to receive output voltage 120 at load 198 and feed directly or indirectly into error comparator 130. Error comparator 130 is multiplexed to on time timer 760 via phase multiplexer 766. On time timer 760 is coupled, for example, in a loop configuration to minimum off time timer 768. The output of on time timer 760 is input into pulse generator 720, the outputs of which are combined by combiner 730 and input to pulse stretcher module 740. The output signal 776 of pulse stretcher module 740 is input to phase multiplexer 766 via phase selector 170.

In operation, phase multiplexer 766 multiplexes digital output signal 152 of error comparator 130 with each combination of on time timer 760 and minimum off time timer 768 to generate one of PWMx pulse 192, 194, for example, at a rising edge of digital output signal 152. In one embodiment, each PWMx pulse 192, 194 is sequentially input to pulse generator 720. In response to receiving a rising edge of one of PWMx pulses 192, 194 at a time, corresponding pulse generator 720 generates a pulse of $T_P$ 774 (e.g., 2-5 nsec) duration. Pulse duration $T_P$ 774 is relatively shorter than either one of $T_{ON}$ and $T_{DLP}$, wherein $T_{DLP}$ is the desired nonoverlap time between two consecutive phases to be turned on. Pulse generator 720 may be implemented, for example, via logic gate delays.

The outputs of two or more pulse generators 720 are combined in combiner 730, for example in an OR gate to output a clock-signal like train of nonoverlapping pulses EAPLS 770. In this example, each pulse in signal EAPLS 770 has a duration of $T_P$ and is triggered by the same on-time rising edge of PWMx pulse 192, 194, so that the period of signal EAPLS 770 has the same period as an internal switching period of switching regulator controller 702.

Pulse stretcher module 740 is a device that extends the duration of pulse $T_P$ 774 of signal EAPLS 770 to be at least as long as a nonoverlap time $T_{DLP}$. Pulse stretcher module 740 may be implemented as a minimum nonoverlap timer. Output signal (labeled EACK) 776 of pulse stretcher module 740 is similar to signal EAPLS 770. In one embodiment, pulse $T_P$ 774 is extended to be as long as $T_{DLP}$, and the duration of $T_{DLP}$ is less than the sum of $T_{ON}$ and $T_{MINOFF}$, which adjusts the minimum time between two consecutive turn on phases to have a duration of at least $T_{DLP}$. In other words, while the distance between rising edges of signal EAPLS 770 may be equal to each triggered phase of the switching frequency system, the on time $T_{ON}$ of the pulses of signal EAPLS 770 followed by the minimum off time $T_{MINOFF}$ should be at least equal to the nonoverlap time. As a result, the loop comprising pulse stretcher module 740 ensures that phase selector 170 is prevented from selecting two consecutive pulses prior to the expiration of the nonoverlap time $T_{DLP}$.

Switching regulator controller 702 may comprise inverter 778 that is coupled between pulse stretcher module 740 and phase selector 170. In response to receiving a falling edge of signal EACK 776, inverter 778 generates clock signal EACKB 780 that causes phase selector 170 to direct phase multiplexer 766 to select the next phase to be turned on.

Figure 8:
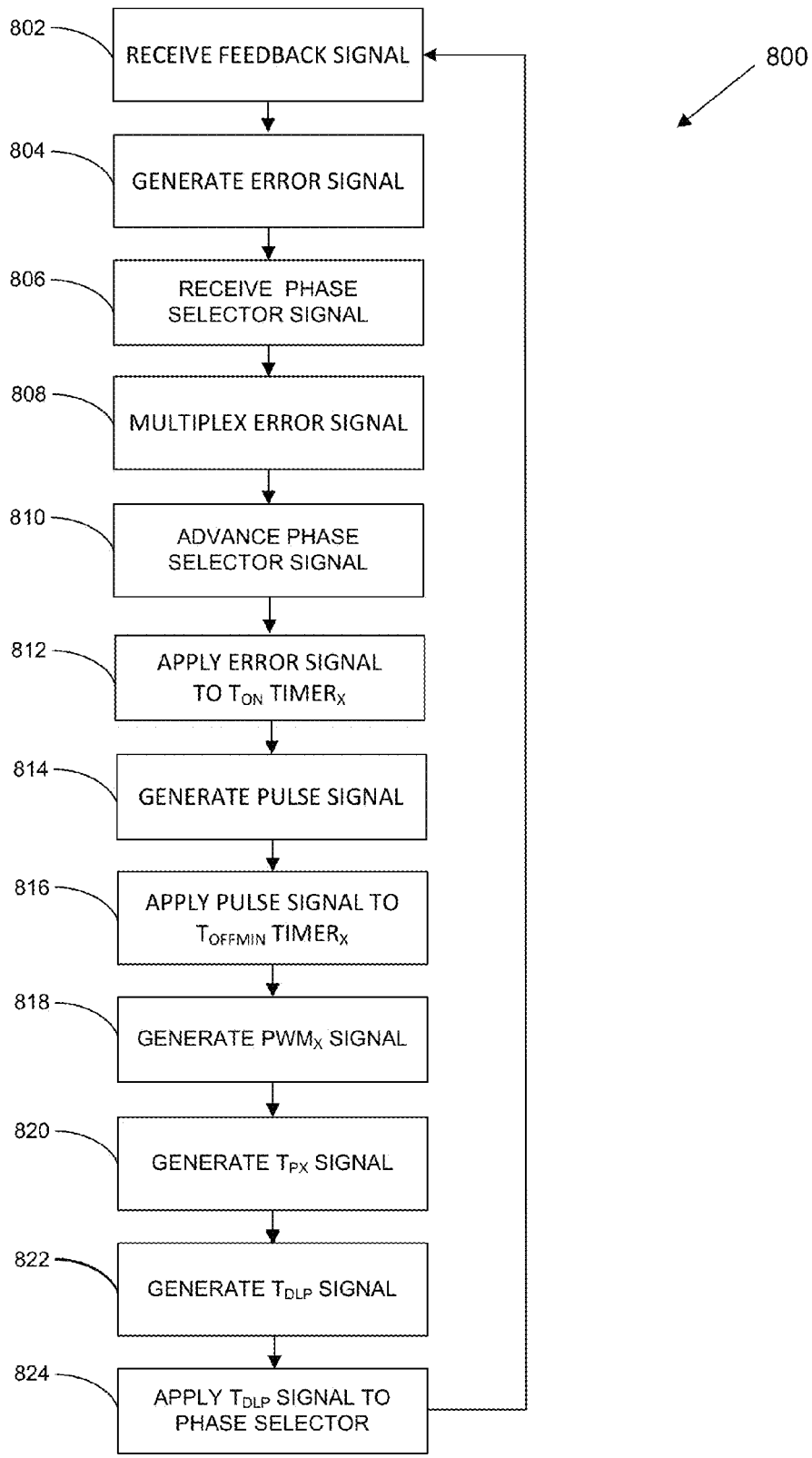
FIG. 8 is a flowchart of an illustrative process for controlling a multiphase switching regulator in accordance with various embodiments of the invention.

FIG. 8 is a flowchart of an illustrative process for controlling a multiphase switching regulator in accordance with various embodiments of the invention.

The control process starts at step 802 when a multiphase switching regulator controller receives a feedback signal, e.g., from a feedback network.

At step 804, an error signal is generated, e.g., by an error amplifier.

At step 806, a phase selector signal is received, e.g., from a signal inverter.

At step 808, the error signal is multiplexed, e.g., in response to a selection made by the phase selector.

At step 810, the phase selector is advanced.

At step 812, the multiplexed error signal is applied to a selected on time timer.

At step 814, a pulse signal comprising an on time is generated.

At step 816, the pulse signal is applied to a selected minimum off time timer to generate a minimum off time signal.

At step 818, a PWM signal is generated, e.g., at the output of the on time timer.

At step 820, a relatively narrow pulse signal is generated, e.g., a 2 ns pulse in response to the PWM signal.

At step 822, the relatively narrow pulse is extended, e.g., to a value equal to a minimum nonoverlap width.

Finally, at step 824, the extended pulse is applied to the phase selector, at which time the process may return to step 802.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A multiphase switching regulator comprising:
    a phase multiplexer coupled to receive both an error signal and a phase selector signal, the phase multiplexer is configured to output a multiplexed error signal;
    a set of on time timers to generate a plurality of pulse signals in response to receiving the multiplexed error signal, each pulse signal comprising an on time;
    a pulse generator coupled to receive the plurality of pulse signals, the pulse generator generates a first sequence of pulse signals;
    a pulse stretcher to generate a second sequence of pulse signals from the first sequence of pulse signals; and
    a phase selector coupled to receive the second sequence of pulse signals to generate the phase selector signal.

2. The multiphase switching regulator according to claim 1, further comprising a set of minimum off time timers coupled to the set of on time timers, the set of minimum off time timers is configured to modify the plurality of pulse signals.

3. The multiphase switching regulator according to claim 2, wherein the set of minimum off time timers is configured to generate minimum off times in the plurality of pulse signals.

4. The multiphase switching regulator according to claim 1, wherein the first sequence of pulse signals comprises one or more pulses that have a predetermined duration that is relatively shorter than both the on time and a predetermined nonoverlap time between the on time of two consecutive pulse signals.

5. The multiphase switching regulator according to claim 4, wherein the one or more pulses are sequentially triggered at rising edges of the on time.

6. The multiphase switching regulator according to claim 4, wherein the pulse stretcher is configured to extend the one or more pulses to have one or more predetermined nonoverlap times.

7. The multiphase switching regulator according to claim 6, wherein a predetermined nonoverlap time is less than a sum of the on time and a minimum off time.

8. The multiphase switching regulator according to claim 7, wherein the nonoverlap time between two consecutive turn on phases prevents the phase selector from selecting two consecutive pulses prior to the expiration of the nonoverlap time.

9. The multiphase switching regulator according to claim 1, wherein the phase multiplexer multiplexes at a rising edge of the error signal.

10. The multiphase switching regulator according to claim 1, wherein the error signal is generated by an error amplifier in response to detecting an error exceeding a first predetermined value.

11. A method to control a multiphase switching regulator, the method comprising:
multiplexing an error signal in response to a phase selector signal;
applying the multiplexed error signal to a first timer, the first timer defines a first pulse signal comprising an on time;
generating an output signal;
generating a second pulse signal in response to the output signal;
extending the second pulse signal to a third pulse signal; and
applying the third pulse signal to the phase selector.

12. The method according to claim 11, wherein the first pulse signal comprises a minimum off time.

13. The method according to claim 12, further comprising applying the first pulse signal to a second timer, the second timer defines the minimum off time.

14. The method according to claim 11, wherein the third pulse signal comprises a minimum nonoverlap width.

15. The method according to claim 11, further comprising advancing the phase selector signal.

16. The method according to claim 11, wherein the first timer is an on time timer.

17. A multiphase switching regulator system comprising:
an error amplifier coupled to receive a feedback signal;
a multiplexer coupled to the error amplifier, the multiplexer receives an error signal from the error amplifier, the multiplexer outputs a multiplexed error signal in response to receiving a phase selector signal;
a first timer coupled to receive the multiplexed error signal to output a first pulse signal comprising an on time;
a pulse generator that generates a second pulse signal in response to the first pulse signal;
a pulse stretcher that extends the second pulse signal to a third pulse signal;
a phase selector coupled to receive the third pulse signal and output the phase selector signal;
a switching network coupled to receive the first pulse signal, the switching network generates an inductor current that flows to a load; and
a feedback network coupled between the load and the error amplifier, the feedback network generates the feedback signal in response to receiving a load signal from the load.

18. The system according to claim 17, wherein the pulse generator comprises a combiner, coupled between a signal generator and the pulse stretcher, the combiner combines two or more outputs of the signal generator.

19. The system according to claim 17, wherein the phase selector comprises an inverter that inverts the third pulse signal at a falling edge.

20. The system according to claim 17, wherein the pulse stretcher includes a minimum nonoverlap timer.

* * * * *